United States Patent
Lee

(10) Patent No.: US 12,025,218 B1
(45) Date of Patent: Jul. 2, 2024

(54) METHOD FOR CONTROLLING POWERTRAIN OF VEHICLE

(71) Applicants: HYUNDAI MOTOR COMPANY, Seoul (KR); KIA CORPORATION, Seoul (KR)

(72) Inventor: Sang Chul Lee, Seoul (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 0 days.

(21) Appl. No.: 18/414,700

(22) Filed: Jan. 17, 2024

(30) Foreign Application Priority Data

Aug. 14, 2023 (KR) .......................... 10-2023-0106345

(51) Int. Cl.
*F16H 61/02* (2006.01)
*F16H 61/00* (2006.01)

(52) U.S. Cl.
CPC ... *F16H 61/0265* (2013.01); *F16H 2061/009* (2013.01)

(58) Field of Classification Search
CPC ............. F16H 61/0265; F16H 61/0204; F16H 61/0213; F16H 2061/009; F16H 2061/0078; F16H 2061/0087; F16H 2061/0093; F16H 2061/0096; F16H 2061/0216; F16H 2061/022
See application file for complete search history.

(56) References Cited

U.S. PATENT DOCUMENTS

| | | | |
|---|---|---|---|
| 4,843,553 A * | 6/1989 | Ohata | B60K 31/047 123/352 |
| 6,594,573 B1* | 7/2003 | Rossmann | G05B 13/04 701/67 |
| 2018/0202543 A1* | 7/2018 | Srinivasan | B60W 10/115 |

FOREIGN PATENT DOCUMENTS

KR 2023-0024493 A 2/2023

* cited by examiner

*Primary Examiner* — Timothy Hannon
(74) *Attorney, Agent, or Firm* — MCDONNELL BOEHNEN HULBERT & BERGHOFF LLP

(57) ABSTRACT

A method of controlling a powertrain of a vehicle includes determining, by a controller, whether or not a transmission is shifting and, if the transmission is shifting, the type of shifting, selecting a predetermined control matrix according to whether or not the transmission is shifting and the type of shifting, calculating a required torque of a transmission component to be controlled based on the selected control matrix, calculating a hydraulic control pressure to implement the required torque of the transmission component to be controlled, and controlling the transmission component to be controlled using the calculated hydraulic control pressure, wherein the control matrix is calculated using correlation equations of angular velocities, angular accelerations, moments of inertia, and torques of powertrain components, and boundary conditions according to the state of the transmission.

20 Claims, 10 Drawing Sheets

FIG. 2

| Shift stages | Transmission components | | | | | |
|---|---|---|---|---|---|---|
| | UDC | ODC | 37RC | 46C | 28B | LRB |
| P |  |  |  |  |  | O |
| R |  |  | O |  |  | O |
| N |  |  |  |  |  | O |
| 1 | O |  |  |  |  | O |
| 2 | O |  |  |  | O |  |
| 3 | O |  | O |  |  |  |
| 4 | O |  |  | O |  |  |
| 5 | O | O |  |  |  |  |
| 6 |  | O |  | O |  |  |
| 7 |  | O | O |  |  |  |
| 8 |  | O |  |  | O |  |

| | $(T_r)$ | $(T_{RD})$ | $(T_{DC})$ | $(T_{OD})$ | $(T_{UD})$ | $(T_{46})$ | $(T_{28})$ | $(T_{37})$ | $(T_{LRB})$ | $(T_E)$ | $(T_{IS})$ | $(T_{MT})$ | $(T_{Imp})$ |
|---|---|---|---|---|---|---|---|---|---|---|---|---|---|
| $\dot\omega_T$ | 0.304 | -0.034 | 0.304 | -0.236 | 0.000 | -0.304 | 0.000 | -0.163 | -0.068 | 0.000 | 0.000 | 0.000 | 0.000 |
| $\dot\omega_{IS}$ | 0.304 | -0.034 | 0.304 | -0.236 | 0.000 | -0.304 | 0.000 | -0.163 | -0.068 | 0.000 | 0.000 | 0.000 | 0.000 |
| $\dot\omega_{S1}$ | 0.000 | 0.000 | 0.000 | 0.000 | 0.000 | 0.000 | 0.000 | 0.000 | 0.000 | 0.000 | 0.000 | 0.000 | 0.000 |
| $\dot\omega_{S2}$ | 0.163 | -0.018 | 0.163 | -0.127 | 0.000 | -0.163 | 0.000 | -0.087 | -0.036 | 0.000 | 0.000 | 0.000 | 0.000 |
| $\dot\omega_{R1}$ | 0.105 | -0.012 | 0.105 | -0.081 | 0.000 | -0.105 | 0.000 | -0.056 | -0.023 | 0.000 | 0.000 | 0.000 | 0.000 |
| $\dot\omega_{R2}$ | 0.000 | 0.000 | 0.000 | 0.000 | 0.000 | 0.000 | 0.000 | 0.000 | 0.000 | 0.000 | 0.000 | 0.000 | 0.000 |
| $\dot\omega_{C2}$ | 0.068 | -0.008 | 0.068 | -0.053 | 0.000 | -0.068 | 0.000 | -0.036 | -0.015 | 0.000 | 0.000 | 0.000 | 0.000 |
| $\dot\omega_C$ | 0.000 | 0.000 | 0.000 | 0.000 | 0.000 | 0.000 | 0.000 | 0.000 | 0.022 | 0.000 | 0.000 | 0.000 | 0.000 |
| $\dot\omega_{TF}$ | -0.101 | 0.011 | -0.101 | 0.078 | 0.000 | 0.101 | 0.000 | 0.054 | -0.008 | 0.000 | 0.000 | 0.000 | 0.000 |
| $\dot\omega_{OUT}$ | 0.034 | -0.004 | 0.034 | -0.027 | 0.000 | -0.034 | 0.000 | -0.018 | 0.000 | 0.000 | 0.000 | 0.000 | 0.000 |
| $\dot\omega_E$ | 0.000 | 0.000 | -4.931 | 0.000 | 0.000 | 0.000 | 0.000 | 0.000 | 0.012 | 4.931 | 0.000 | 0.000 | -4.931 |
| $T_{UD}$ | 2.563 | 0.006 | 2.563 | -2.575 | 0.000 | -2.563 | 0.000 | -1.375 | -0.357 | 0.000 | 0.000 | 0.000 | 0.000 |
| $T_{28}$ | -1.017 | -0.002 | -1.017 | 1.374 | 0.000 | 2.017 | 0.000 | 1.546 | 0.003 | 0.000 | 0.000 | 0.000 | 0.000 |
| $T_{IS}$ | 0.985 | 0.002 | 0.985 | 0.012 | 0.000 | 0.015 | 0.000 | 0.008 | 0.639 | -1.000 | 0.000 | 0.000 | 0.000 |
| $T_{MT}$ | -1.863 | -0.004 | -1.863 | 2.224 | 0.000 | 2.863 | 0.000 | 1.536 | | | | | |

| | (T_T) | (T_RD) | (T_DC) | (T_OD) | (T_UD) | (T_4G) | (T_28) | (T_37) | (T_LRB) | (T_E) | (T_IS) | (T_MT) | (T_Imp) |
|---|---|---|---|---|---|---|---|---|---|---|---|---|---|
| $\dot{\omega}_T$ | 8.901 | -0.014 | 8.901 | -11.853 | 0.000 | -17.357 | 8.456 | -13.232 | 2.951 | 0.000 | 0.000 | 0.000 | 0.000 |
| $\dot{\omega}_{IS}$ | 8.901 | -0.014 | 8.901 | -11.853 | 0.000 | -17.357 | 8.456 | -13.232 | 2.951 | 0.000 | 0.000 | 0.000 | 0.000 |
| $\dot{\omega}_{S1}$ | -8.456 | -0.020 | -8.456 | 11.425 | 0.000 | 16.773 | -8.317 | 12.854 | -2.969 | 0.000 | 0.000 | 0.000 | 0.000 |
| $\dot{\omega}_{S2}$ | 4.776 | -0.008 | 4.776 | -6.360 | 0.000 | -9.314 | 4.537 | -7.100 | 1.584 | 0.000 | 0.000 | 0.000 | 0.000 |
| $\dot{\omega}_{R1}$ | 0.044 | -0.012 | 0.044 | 0.001 | 0.000 | 0.016 | -0.060 | 0.036 | -0.045 | 0.000 | 0.000 | 0.000 | 0.000 |
| $\dot{\omega}_{R2}$ | -8.456 | -0.020 | -8.456 | 11.425 | 0.000 | 16.773 | -8.317 | 12.854 | -2.969 | 0.000 | 0.000 | 0.000 | 0.000 |
| $\dot{\omega}_{C2}$ | -2.951 | -0.015 | -2.951 | 4.027 | 0.000 | 5.921 | -2.969 | 4.553 | -1.075 | 0.000 | 0.000 | 0.000 | 0.000 |
| $\dot{\omega}_C$ | 0.000 | 0.000 | 0.000 | 0.000 | 0.000 | 0.000 | 0.000 | 0.000 | 0.000 | 0.000 | 0.000 | 0.000 | 0.000 |
| $\dot{\omega}_{TF}$ | -0.042 | 0.011 | -0.042 | -0.001 | 0.000 | -0.015 | 0.058 | -0.035 | 0.043 | 0.000 | 0.000 | 0.000 | 0.000 |
| $\dot{\omega}_{OUT}$ | 0.014 | -0.004 | 0.014 | 0.000 | 0.000 | 0.005 | -0.020 | 0.012 | -0.015 | 0.000 | 0.000 | 0.000 | 0.000 |
| $\dot{\omega}_E$ | 0.000 | 0.000 | -4.931 | 0.000 | 0.000 | 0.000 | 0.000 | 0.000 | 0.000 | 4.931 | 0.000 | 0.000 | -4.931 |
| $T_{UD}$ | 0.998 | 0.002 | 0.998 | -0.460 | 0.000 | 0.542 | -1.539 | 1.004 | -0.538 | 0.000 | 0.000 | 0.000 | 0.000 |
| $T_{IS}$ | 0.550 | 0.001 | 0.550 | 0.600 | 0.000 | 0.878 | -0.428 | 0.670 | -0.149 | 0.000 | 0.000 | 0.000 | 0.000 |
| $T_{MT}$ | -0.359 | -0.001 | -0.359 | 0.192 | 0.000 | -0.120 | 1.479 | -0.750 | -1.167 | 0.000 | 0.000 | 0.000 | 0.000 |

= H ×

D → { $T_T$, $T_{RD}$, $T_{DC}$, $T_{OD}$, $T_{UD}$, $T_{4G}$, $T_{28}$, $T_{37}$, $T_{LRB}$, $T_E$, $T_{IS}$, $T_{MT}$, $T_{Imp}$ }

METHOD FOR CONTROLLING POWERTRAIN OF VEHICLE

CROSS REFERENCE TO RELATED APPLICATIONS

This application is based on and claims priority under 35 U.S.C. § 119 to Korean Patent Application No. 10-2023-0106345, filed on Aug. 14, 2023, in the Korean Intellectual Property Office, the disclosure of which is herein incorporated by reference in its entirety.

BACKGROUND

1. Field

The present disclosure relates to a technology for controlling a powertrain that transmits power generated from an engine mounted to a vehicle to driving wheels.

2. Description of the Prior Art

A powertrain of a vehicle is configured to include a number of parts such as a transmission to transmit power generated in the engine to the drive wheels at an appropriate number of revolutions and torque.

A transmission control unit (TCU) for controlling the transmission is configured to control the transmission on the basis of a variety of control data preset for the transmission for control suitable for various driving conditions of the vehicle.

Conventionally, a method in which a human manually performs mapping of the control data while repeatedly driving a corresponding transmission is used.

The manually mapped control data described above highly relies on human experience or proficiency in mapping the control data, resulting in lack of data reliability and a considerable period of time required to construct the control data.

The foregoing described as the background art is intended merely to aid in the understanding of the background of the present disclosure, and is not intended to mean that the present disclosure falls within the purview of the related art already known to those skilled in the art.

SUMMARY

The present disclosure is to provide a method of controlling a powertrain of a vehicle, which produces a powertrain model of a vehicle and enables a TCU to control a transmission on the basis of the powertrain model, thereby enabling rapid mapping of control data and securing reliability of control data, so that the marketability of the vehicle is improved by improving the gear shifting quality of the vehicle.

In view of the foregoing, a method of controlling a powertrain of a vehicle may include: by a controller, determining whether or not a transmission is shifting and, if the transmission is shifting, the type of shifting; selecting a predetermined control matrix according to whether or not the transmission is shifting and the type of shifting; calculating a required torque of a transmission component to be controlled on the basis of the selected control matrix; calculating a hydraulic control pressure to implement the required torque of the transmission component to be controlled; and controlling the transmission component to be controlled using the calculated hydraulic control pressure, wherein the control matrix is calculated using correlation equations of angular velocities, angular accelerations, moments of inertia, and torques of powertrain components, and boundary conditions according to the state of the transmission.

The control matrix may be calculated by multiplying an inverse matrix of a dominant matrix of angular acceleration configured to include coefficients of angular acceleration terms of the correlation equations by a dominant matrix of external torque configured to include coefficients of external torque terms of the correlation equations, and the external torque may be a torque capable of being controlled by the controller or input to the powertrain from the outside.

The dominant matrix of angular acceleration may be configured by changing a correlation equations of angular velocities and gear ratios for rotating components constituting planetary gear devices of the transmission into angular acceleration correlation equations by differentiating the same, moving all terms to one side such that the other side becomes 0, separating the angular acceleration terms placed on one side into a form of the product of a coefficient matrix of angular acceleration and an angular acceleration column vector, and including the separated coefficient matrix of angular acceleration.

The dominant matrix of angular acceleration may be configured by changing correlation equations of angular velocities and gear ratios for powertrain components constituting a power transmission path from an output component of the transmission to an output shaft to which wheels are coupled into angular acceleration correlation equations by differentiating the same, moving all terms to one side such that the other side becomes 0, separating the angular acceleration terms placed on one side into a form of the product of a coefficient matrix of angular acceleration and an angular acceleration column vector, and including the separated coefficient matrix of angular acceleration.

The dominant matrix of angular acceleration may be configured by producing theorem correlation equations including the angular acceleration terms of the powertrain components and the external torque terms from correlation equations of torques and gear ratios for rotating components constituting planetary gear devices of the transmission, correlation equations of torques and gear ratios for rotating components constituting a torque converter, and correlation equations of angular accelerations, moments of inertia, and torques of the powertrain components, placing the angular acceleration terms and external torque terms of the theorem correlation equations to be separated on both sides, separating the angular acceleration terms placed on one side into a form of the product of a coefficient matrix of angular acceleration and an angular acceleration column vector, and including the separated coefficient matrix of angular acceleration.

The control matrix may be configured to include in-gear state control matrices for an in-gear state in which the transmission is not shifting and dynamic-state control matrices for a state in which the transmission is shifting.

The in-gear state control matrix may be provided to each shift stage capable of being implemented by the transmission, and the dynamic-state control matrix may be provided to each transmission component that remains in an engaged state during gear shifting.

The controller, if the transmission is shifting, may select a control matrix for a transmission component that remains in the engaged state before and after gear shifting from among the dynamic-state control matrices.

The dominant matrix of angular acceleration may be configured as a square matrix configured by separating the angular acceleration terms of the correlation equations into a form of the product of a coefficient matrix of angular acceleration and an angular acceleration column vector so as to be placed on one side, separating the external torque terms of the correlation equations into a form of the product of a coefficient matrix of external torque and an external torque column vector so as to be placed on the other side, placing a rigid connection matrix, which is obtained by multiplying columns of coefficients for external torque terms of the powertrain components, in the coefficient matrix of external torque, in the fully connected state capable of being regarded as linear variables that change depending on the torque input to the powertrain by −1, so as to be connected to the right side of the coefficient matrix of angular acceleration, placing a boundary condition matrix including rows representing boundary conditions according to the state of the transmission so as to be connected to the bottom of the coefficient matrix of angular acceleration, and placing a dummy matrix filled with 0s at a position where the rigid connection matrix and the boundary condition matrix intersect in the coefficient matrix of angular acceleration.

The dominant matrix of external torque may be configured to include the coefficient matrix of external torque filled with 0s in the columns used in the rigid connection matrix and a dummy matrix filled with 0s in the rows corresponding to the boundary condition matrix of the dominant matrix of angular acceleration.

The required torque of the transmission component to be controlled may be calculated from a correlation equation of control matrix indicating that the product of the control matrix and the external torque column vector multiplied on the right side thereof is equal to a state column vector configured by arranging the angular accelerations and external torques corresponding to the respective columns of the dominant matrix of angular acceleration in sequence.

The correlation equation of control matrix for calculating the required torque of the transmission component on the release side, among the transmission components to be controlled, may use an in-gear state control matrix of a current shift stage as the control matrix.

The required torque of the transmission component on the release side may be calculated by deleting, as 0, external torque terms, which are negligible or irrelevant to the current state of the transmission, from a partial correlation equation, in the correlation equation of control matrix, indicating that the product of the row of the control matrix equal to the row of the external torque corresponding to the torque of the transmission component on the release side, among the rows of the state column vector, and the external torque column vector is equal to the required torque of the transmission component on the release side.

The required torque of the transmission component on the release side may be calculated by deleting, as 0, the terms of the remaining external torques, excluding a turbine torque and a driving resistance torque, among the terms of the external torques, from a partial correlation equation, in the correlation equation of control matrix, indicating that the product of the row of the control matrix equal to the row of the external torque corresponding to the torque of the transmission component on the release side, among the rows of the state column vector, and the external torque column vector is equal to the required torque of the transmission component on the release side.

The controller may use, in order to calculate a preparatory hydraulic pressure of the transmission component on the coupled side, which is necessary to prevent the shifting sag phenomenon immediately before the transmission starts shifting, the correlation equation of control matrix for calculating the required torque of the transmission component on the release side, calculate the angular acceleration of the output shaft by deleting, as 0, the terms of the remaining external torques, excluding a turbine torque and a driving resistance torque, among the external torque terms, from a partial correlation equation, in the correlation equation of control matrix, indicating that the product of the row of the control matrix, which is equal to the row of the angular acceleration of the output shaft to which wheels are connected in the state column vector, and the external torque column vector is equal to the angular acceleration of the output shaft, calculate a correction angular acceleration of the output shaft by reducing the calculated angular acceleration of the output shaft by a predetermined amount of acceleration reduction, delete, as 0, the terms of the remaining external torques, excluding the turbine torque, the driving resistance torque, and a torque of the transmission component on the coupled side, among the external torque terms, from a partial correlation equation, in the correlation equation of control matrix, indicating that the product of the row of the control matrix, which is equal to the row of the angular acceleration of the output shaft to which the wheels are connected in the state column vector, and the external torque column vector is equal to the angular acceleration of the output shaft, replace the correction angular acceleration of the output shaft with the angular acceleration of the output shaft, calculate a torque of the transmission component on the coupled side, and calculate a hydraulic pressure for realizing the calculated torque of the transmission component on the coupled side to determine the preparatory hydraulic pressure of the transmission component on the coupled side necessary to prevent the shifting sag phenomenon.

The correlation equation of control matrix for calculating the required torque of the transmission component on the coupled side, among the transmission components to be controlled, may use a dynamic-state control matrix for a transmission component that remains in the engaged state before and after the corresponding shifting as the control matrix.

The required torques of the transmission component on the coupled side, which is a target torque of the transmission component on the coupled side, may be determined by calculating a torque of the transmission component on the coupled side from a correlation equation obtained by zeroizing the angular acceleration of the turbine in a partial correlation equation, in the correlation equation of control matrix, indicating that the product of the row of the control matrix, which is equal to the row of the angular acceleration of the turbine in the state column vector, and the external torque column vector is equal to the angular acceleration of the turbine, and deleting, as 0, the terms of the remaining external torques, excluding the torque of the turbine, the driving resistance torque, and the torque of the transmission component on the coupled side, among the external torque terms, therefrom.

The controller may delete, as 0, the terms of the remaining external torques, excluding the torque of the turbine, the driving resistance torque, and the torque of the transmission component on the coupled side, among the external torque terms, from the partial correlation equation of the correlation equation of control matrix used in obtaining the required torque of the transmission component on the coupled side, replace a target change rate of the turbine per unit time by the angular acceleration of the turbine, control the transmission component on the coupled side using the target torque, calculate a PID torque, which is the torque of the transmission component on the coupled side, to be changed, calculate a hydraulic pressure for realizing the calculate PID torque of the transmission component on the coupled side, control the transmission component on the coupled side using the hydraulic control pressure corresponding to the target torque, and repeatedly determine the PID hydraulic control pressure to be changed during a target shifting time, and the target change rate of the turbine per unit time may be calculated by dividing the angular velocity of the turbine to be changed during the target shifting time by the target shifting time.

The controller may delete, as 0, the terms of the remaining external torques, excluding the torque of the turbine, the driving resistance torque, and the torque of the transmission component on the coupled side, among the external torque terms, from the partial correlation equation of the correlation equation of control matrix used in obtaining the required torque of the transmission component on the coupled side, replace the target change rate of the turbine per unit time by the angular acceleration of the turbine, calculate the torque of the turbine, and perform requesting engine torque reduction using a value obtained by dividing the torque of the turbine by the torque amplification ratio of the torque converter.

The controller may perform, when controlling the transmission component to be controlled to perform gear shifting, a step of learning a difference between a control target and an actual shift state, and may further perform a step of correcting a hydraulic control pressure according to the information learned in the learning step between a step of calculating the hydraulic control pressure for realizing the required torque of the transmission component to be controlled and a step of controlling the transmission component to be controlled using the calculated hydraulic control pressure.

The present disclosure may produce a powertrain model of a vehicle and enable a TCU to control a transmission on the basis of the powertrain model, thereby enabling rapid mapping of control data and securing reliability of control data, so that the marketability of the vehicle is improved by improving the gear shifting quality of the vehicle.

BRIEF DESCRIPTION OF THE FIGURES

The above and other aspects, features, and advantages of the present disclosure will be more apparent from the following detailed description taken in conjunction with the accompanying drawings, in which:

FIG. 2 is an operation mode table of the transmission in FIG. 1;

FIG. 4 is a determinant expressing a correlation equation of angular velocities, angular accelerations, moments of inertia, and torques of the powertrain components in FIG. 1 as the product of a coefficient matrix of angular acceleration and an angular acceleration column vector and the product of an external torque coefficient matrix and an external torque column vector;

FIG. 5 shows a dominant matrix of angular acceleration and a dominant matrix of external torque in a second gear of a transmission from which the state column vector and external torque column vector are omitted;

FIG. 6 shows the relationship between a dominant matrix of angular acceleration and a dominant matrix of external torque to obtain a dynamic-state control matrix in which an underdrive clutch is engaged from which the state column vector and external torque column vector are omitted as in FIG. 5;

FIG. 9 is a diagram illustrating a control matrix correlation equation using a state control matrix in a second gear; and FIG. 10 is a diagram illustrating a control matrix correlation equation using a dynamic-state control matrix for an underdrive clutch as a control matrix.

DETAILED DESCRIPTION

Figure 1:
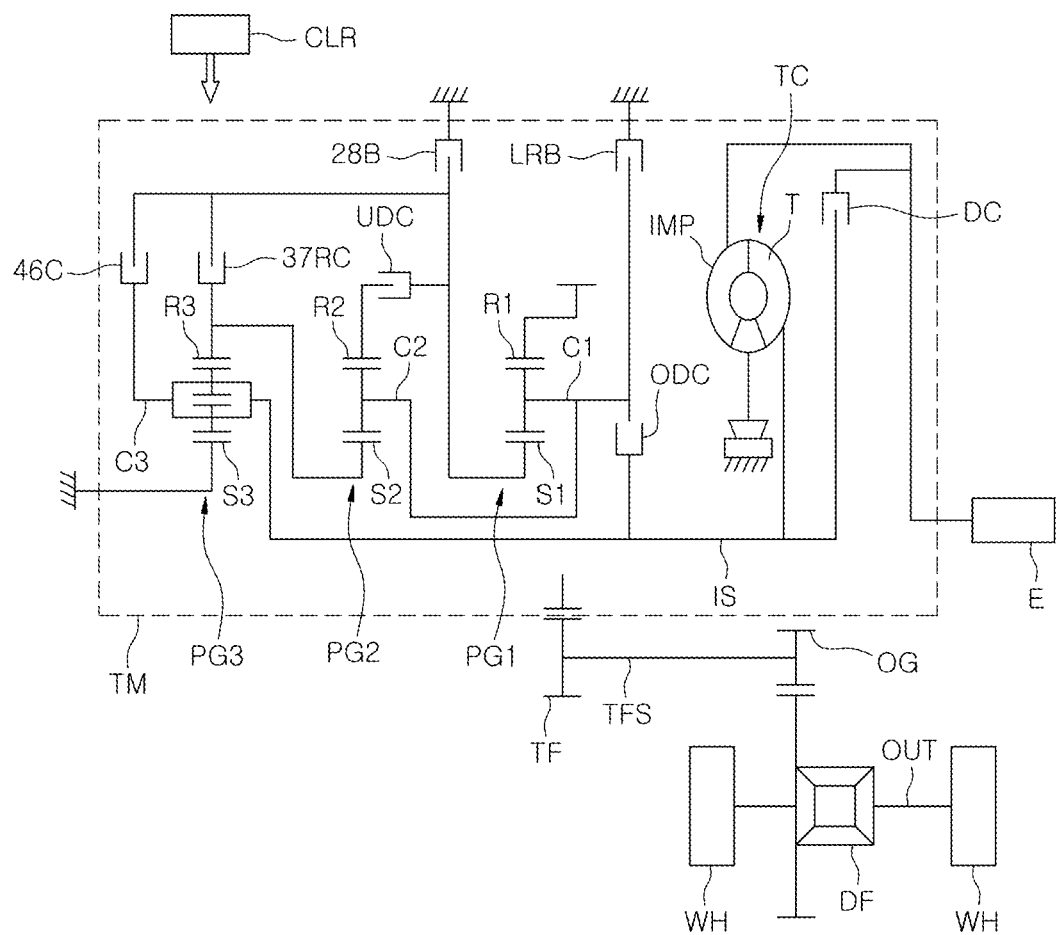
FIG. 1 is a diagram illustrating a powertrain of a vehicle to which the present disclosure may be applied.

Hereinafter, embodiments disclosed in the present specification will be described in detail with reference to the accompanying drawings, and the same or similar elements are given the same and similar reference numerals, so duplicate descriptions thereof will be omitted.

The terms "module" and "unit" used for the elements in the following description are given or interchangeably used in consideration of only the ease of writing the specification, and do not have distinct meanings or roles by themselves.

In describing the embodiments disclosed in the present specification, when the detailed description of the relevant known technology is determined to unnecessarily obscure the gist of the present disclosure, the detailed description may be omitted. Furthermore, the accompanying drawings are provided only for easy understanding of the embodiments disclosed in the present specification, and the technical spirit disclosed herein is not limited to the accompanying drawings, and it should be understood that all changes, equivalents, or substitutes thereof are included in the spirit and scope of the present disclosure.

Terms including an ordinal number such as "first", "second", or the like may be used to describe various elements, but the elements are not limited to the terms. The above terms are used only for the purpose of distinguishing one element from another element.

In the case where an element is referred to as being "connected" or "coupled" to any other element, it should be understood that another element may be provided therebetween, as well as that the element may be directly connected or coupled to the other element. In contrast, in the case where an element is "directly connected" or "directly coupled" to any other element, it should be understood that no other element is present therebetween.

A singular expression may include a plural expression unless they are definitely different in a context.

As used herein, the expression "include" or "have" are intended to specify the existence of mentioned features, numbers, steps, operations, elements, components, or combinations thereof, and should be construed as not precluding the possible existence or addition of one or more other features, numbers, steps, operations, elements, components, or combinations thereof.

Referring to FIGS. 1 and 2, a powertrain of a vehicle to which the present disclosure may be applied has a transmission TM capable of implementing eight (8) forward speeds and reverse, and transmits power of an engine E to a torque converter TC equipped with a damper clutch DC through an input shaft IS so that the power is transmitted to the transmission TM through an impeller IMP and a turbine T of the torque converter TC, and the transmission TM implements the above-mentioned shift stages by the input power through 3 planetary gear devices and six (6) transmission components (e.g., a clutch or a brake), and outputs power from an output component of the transmission TM to an output shaft OUT having a differential DF and wheels WH connected thereto through a transfer gear TF and an out gear OG of a transfer shaft TFS.

The three (3) planetary gear devices includes a first planetary gear device PG1, a second planetary gear device PG2, and a third planetary gear device PG3, which are sequentially arranged from the engine E. The first planetary gear device PG1 includes a first sun gear S1, a first carrier C1, and a first ring gear R1, and the second planetary gear device PG2 includes a second sun gear S2, a second carrier C2, and a second ring gear R2, and the third planetary gear device PG3 includes a third sun gear S3, a third carrier C3, and a third ring gear R3.

The six transmission components may include a low reverse brake LRB, a 28-brake 28B, an overdrive clutch ODC, an underdrive clutch UDC, a 37R clutch 37RC, and a 46-clutch 46C, and a controller CLR that communicates with other controllers such as various sensors or an engine controllers of the vehicle may produce appropriate hydraulic control pressure, thereby controlling the transmission components.

Actually, the controller CLR that controls the transmission TM included in the powertrain described above may be a transmission control unit (TCU) or the like.

The above powertrain may be modeled by the following equations.

$$(1+\gamma_1)\omega_{c2} = \gamma_1 \omega_{JR1} + \omega_{S1} \quad \text{Equation 1:}$$

$$(1+\gamma_2)\omega_{C2} = \gamma_2 \omega_{R2} + \omega_{S2} \quad \text{Equation 2:}$$

$$(-1+\gamma_3)\omega_T = \gamma_3 \omega_{S2} \quad \text{Equation 3:}$$

$$\omega_{R1} = -\gamma_{TF} \omega_{TF} \quad \text{Equation 4:}$$

$$\beta_{TF} = \gamma_{OG} \omega_{OUT} \quad \text{Equation 5:}$$

$$T_{R1} = \gamma_1 T_{S1} \quad \text{Equation 6:}$$

$$T_{R2} = -\gamma_2 T_{S2} \quad \text{Equation 7:}$$

$$T_{R3} = -\gamma_3 T_{S3} \quad \text{Equation 8:}$$

$$T_{Imp} = \gamma_4 T_T \quad \text{Equation 9:}$$

$$I_T \dot{\omega}_T = T_T + T_{DC} - T_{IS} \quad \text{Equation 10:}$$

$$I_{IS} \dot{\omega}_{IS} = T_{IS} - T_{OD} - T_{46} + T_{S3} + T_{R3} \quad \text{Equation 11:}$$

$$I_{S1} \dot{\omega}_{S1} = -T_{UD} + T_{37R} + T_{46} - T_{28} - T_{S1} \quad \text{Equation 12:}$$

$$I_{R2} \dot{\omega}_{R2} = T_{OD} - T_{LR} + T_{S1} + T_{R1} - T_{R2} \quad \text{Equation 13:}$$

$$I_{R1} \dot{\omega}_{R1} = -T_{R1} - T_{TF} \quad \text{Equation 14:}$$

$$I_{S2} \dot{\omega}_{S2} = -T_{37R} - T_{S2} - T_{R3} \quad \text{Equation 15:}$$

$$I_{C2} \dot{\omega}_{C2} = T_{UD} + T_{S2} + T_{R2} \quad \text{Equation 16:}$$

$$0 = -T_{S3} - T_{S3W} \quad \text{Equation 17:}$$

$$I_{TF} \dot{\omega}_{TF} = \gamma_{TF} T_{TF} - T_{OG} = \gamma_{TF} T_{TF} - \frac{T_{OUT}}{\gamma_{OG}} \quad \text{Equation 18}$$

$$I_{DF} \dot{\omega}_{OUT} = \gamma_{OG} T_{OG} - T_{RD} = T_{OUT} - T_{RD} \quad \text{Equation 19:}$$

$$I_C \dot{\omega}_C = -T_E - T_{MT} + T_{28} + T_{LR} + T_{S3} \quad \text{Equation 20:}$$

$$I_E \dot{\omega}_E = T_E - T_{DC} - T_{Imp} \quad \text{Equation 21:}$$

where, $\gamma_1$: Gear ratio of first planetary gear device PG1 (number of teeth of ring gear/number of teeth of sun gear)

$\gamma_2$: Gear ratio of second planetary gear device PG2

$\gamma_3$: Gear ratio of third planetary gear device PG3

$\gamma_{TF}$: Gear ratio between transmission output component and transfer gear TF For reference, the transmission output component becomes the first ring gear R1 of the first planetary gear device PG1 here.

$\gamma_{OG}$: Gear ratio between out gear OG and output shaft OUT

For reference, the output shaft OUT may be a concept including a differential DF that meshes with the out gear OG, and the output shaft OUT and the wheels WH coupled to the differential DF, and more precisely, the output shaft OUT may be understood as a gear ratio between the out gear OG and the ring gear of the differential DF.

$\gamma_4$: Torque ratio of torque converter TC $\omega_{S1}$: Angular velocity of first sun gear S1 of first planetary gear device PG1

$\omega_{R1}$: Angular velocity of first ring gear R1 of first planetary gear device PG1

$\omega_{S2}$: Angular velocity of second sun gear S2 of second planetary gear device PG2

$\omega_{C2}$: Angular velocity of second carrier C2 of second planetary gear device PG2

$\omega_{R2}$: Angular velocity of second ring gear R2 of second planetary gear device PG2

$\omega_T$: Angular velocity of turbine T $\omega_{TF}$: Angular velocity of transfer gear TF $\omega_{OUT}$: Angular velocity of output shaft OUT $\dot{\omega}_T$: Angular acceleration of turbine T $\dot{\omega}_{IS}$: Angular acceleration of input shaft IS $\dot{\omega}_{S1}$: Angular acceleration of first sun gear S1 of first planetary gear device PG1

$\dot{\omega}_{R1}$: Angular acceleration of first ring gear R1 of first planetary gear device PG1

$\dot{\omega}_{S2}$: Angular acceleration of second sun gear S2 of second planetary gear device PG2

$\dot{\omega}_{C2}$: Angular acceleration of second carrier C2 of second planetary gear device PG2

$\dot{\omega}_{R2}$: Angular acceleration of second ring gear R2 of second planetary gear device PG2

$\dot{\omega}_{TF}$: Angular acceleration of transfer gear TF $\dot{\omega}_{OUT}$: Angular acceleration of output shaft OUT $\dot{\omega}_C$: Angular acceleration of transmission case TMC $\dot{\omega}_E$: Angular acceleration of engine E $T_{S1}$: Torque of first sun gear S1 of first planetary gear device PG1

$T_{R1}$: Torque of first ring gear R1 of first planetary gear device PG1

$T_{S2}$: Torque of second sun gear S2 of second planetary gear device PG2

$T_{R2}$: Torque of second ring gear R2 of second planetary gear device PG2

$T_{S3}$: Torque of third sun gear S3 of third planetary gear device PG3

$T_{R3}$: Torque of third ring gear R3 of third planetary gear device PG3

$T_{S3W}$: Reaction torque of transmission case TMC to third ring gear R3 of third planetary gear device PG3

$T_{Imp}$: Torque of impeller IMP $T_T$: Torque of turbine T $T_{DC}$: Torque of damper clutch DC $T_{IS}$: Torque of input shaft IS $T_{OD}$: Torque of overdrive clutch ODC $T_{46}$: Torque of 46-clutch 46C $T_{UD}$: Torque of underdrive clutch UDC $T_{37R}$: Torque of 37R-clutch 37RC $T_{28}$: Torque of 28-brake 28B $T_{LR}$: Torque of low reverse brake LRB $T_{TF}$: Torque of transfer gear TF $T_{OG}$: Torque of out gear OG $T_{OUT}$: Torque of output shaft OUT $T_{RD}$: Driving resistance torque $T_E$: Torque of engine E $T_{MT}$: Mounting torque of transmission TM $I_T$: Moment of inertia of turbine T $I_{IS}$: Moment of inertia of input shaft IS $I_{S1}$: Moment of inertia of first sun gear S1 of first planetary gear device PG1

$I_{R1}$: Moment of inertia of first ring gear R1 of first planetary gear device PG1

$I_{S2}$: Moment of inertia of second sun gear S2 of second planetary gear device PG2

$I_{C2}$: Moment of inertia of second carrier C2 of second planetary gear device PG2

$I_{R2}$: Moment of inertia of second ring gear R2 of second planetary gear device PG2

$I_{TF}$: Moment of inertia of transfer shaft TFS $I_{DF}$: Moment of inertia of output shaft OUT $I_C$: Moment of inertia of transmission case TMC $I_E$: Moment of inertia of engine E Here, Equations 1 to 3 are correlation equations of angular velocities and gear ratios for rotating components constituting the planetary gear devices of the transmission TM.

Equations 4 and 5 are correlation equations of angular velocities and gear ratios for components constituting the power transmission path from the output component of the transmission TM to the output shaft OUT to which the wheels WH are connected, among the powertrain components.

Equations 6 to 8 are correlation equations of torques and gear ratios for rotating components constituting the planetary gear device of the transmission TM.

Equation 9 is a correlation equation of torques and gear ratios for rotating components, that is, the impeller IMP and the turbine T, constituting the torque converter TC.

Equations 10 to 21 establish correlation equations of angular accelerations, moments of inertia, and torques for respective rigid connection units of the powertrain components.

Figure 3:
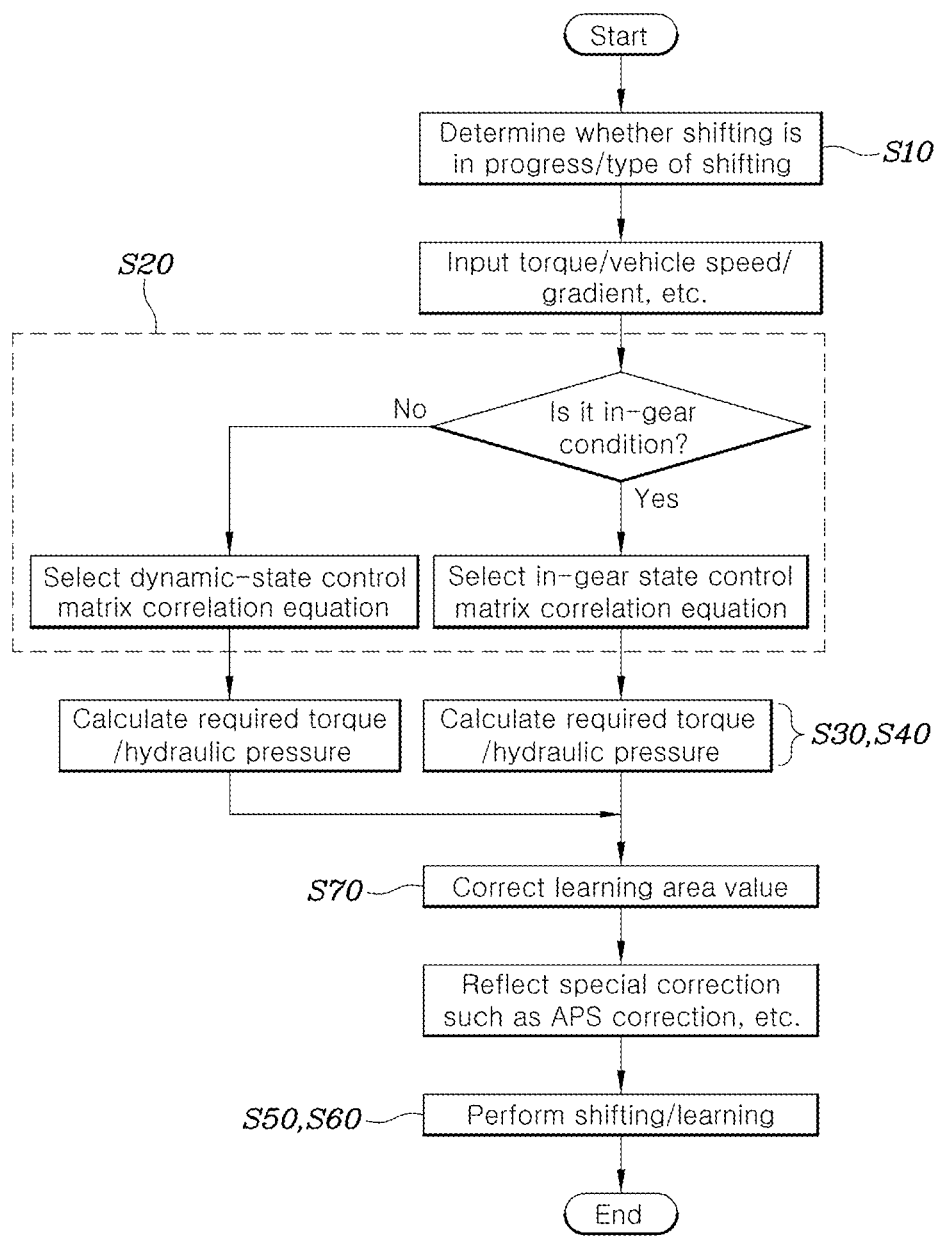
FIG. 3 is a flowchart illustrating a method for controlling a powertrain of a vehicle according to the present disclosure.

Referring to FIG. 3, an embodiment of the method for controlling a powertrain of a vehicle according to the present disclosure is configured to include a step S10 of determining, by the controller CLR, whether or not shifting is in progress in the transmission TM and, if the shifting is in progress, the type of shifting, a step S20 of selecting a predetermined control matrix H depending on whether or not the shifting is in progress and the type of shifting, a step S30 of calculating a required torque of a transmission component to be controlled based on the selected control matrix H, a step S40 of calculating hydraulic control pressure to realize the required torque of the transmission component to be controlled, and a step S50 of controlling the transmission component to be controlled using the calculated hydraulic control pressure.

The control matrix H is calculated using boundary conditions according to the correlation equations of the angular velocities, angular accelerations, moments of inertia, and torques of the powertrain components in Equations 1 to 21, and the state of the transmission TM.

The control matrix H is calculated by multiplying the inverse matrix of a dominant matrix of angular acceleration A_G including the coefficients of the angular acceleration terms of the correlation equations by a dominant matrix of external torque C_G including the coefficients of external torque terms of the correlation equations.

Here, the external torques indicate torques controllable by the controller CLR or input to the powertrain from the outside, and there is a total of thirteen (13) external torques in Equations 1 to 21 above, such that as a torque $T_T$ of the turbine T, a driving resistance torque $T_{RD}$, a torque $T_{DC}$ of the damper clutch DC, a torque $T_{OD}$ of the overdrive clutch ODC, a torque $T_{UD}$ of the underdrive clutch, a torque $T_{46}$ of the 46-clutch 46C, a torque $T_{28}$ of the 28-brake 28B, a torque $T_{37R}$ of the 37R-clutch 37RC, a torque $T_{LR}$ of the low reverse brake, a torque $T_E$ of the engine E, a torque $T_{IS}$ of the input shaft IS, a mounting torque $T_{MT}$ of the transmission TM, and a torque $T_{Imp}$ of the impeller IMP.

Figure 4:
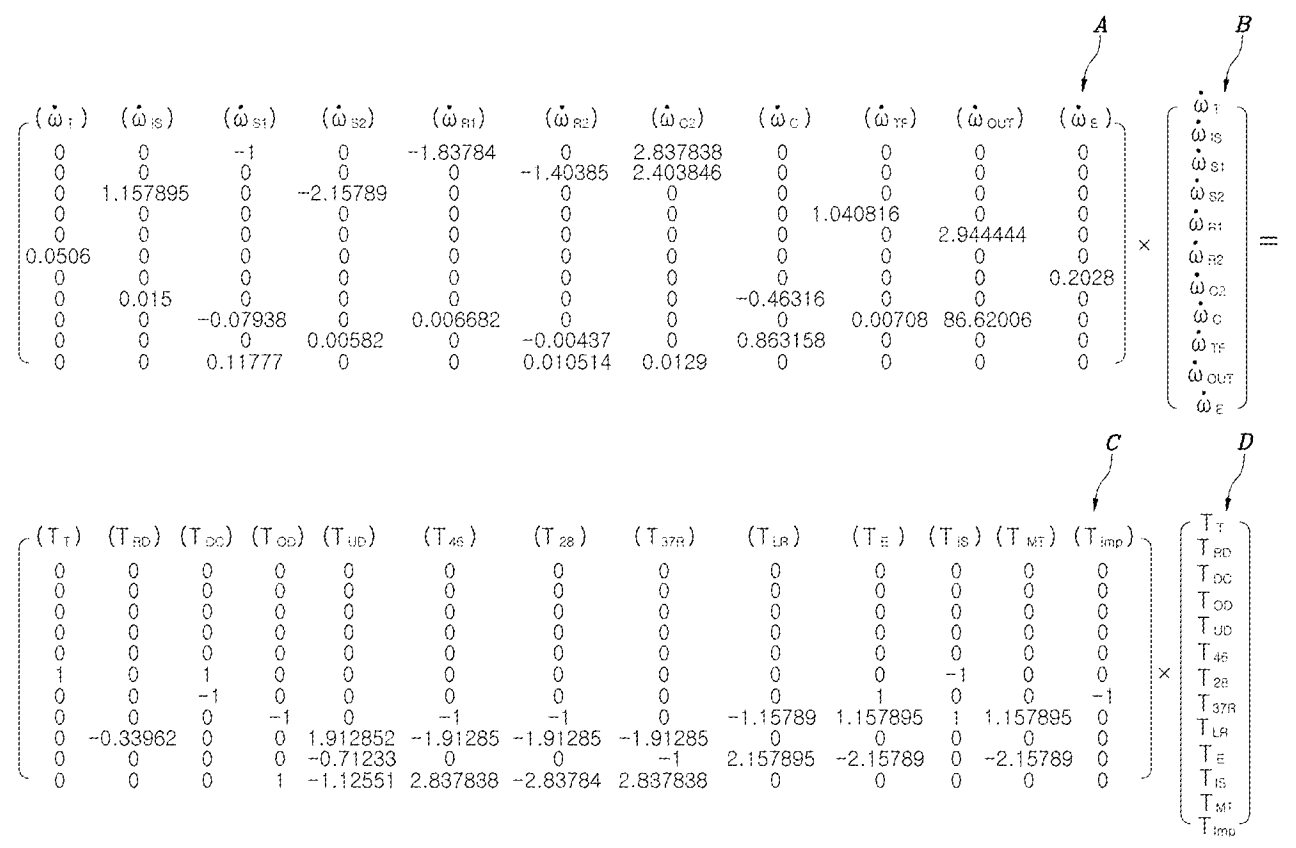

In order to produce the dominant matrix of angular acceleration A_G, a determinant showing that the product of the coefficient matrix of angular acceleration A and the angular acceleration column vector B is equal to the product of the coefficient matrix of external torque C and the external torque column vector D as shown in FIG. 4 is preferentially produced using Equations 1 to 21.

That is, the determinant in FIG. 4 may be expressed as A*B=C*D.

For reference, the parentheses at the top of the coefficient matrix of angular acceleration A in FIG. 4 are reference marks indicating angular accelerations to which the coefficients of corresponding columns correspond, and the parentheses at the top of the coefficient matrix of external torque are reference marks indicating external torques to which the coefficients of corresponding columns correspond.

Specifically, in the case of Equations 1 to 5, a method of producing the coefficient matrix of angular acceleration A includes changing these equations into an angular acceleration correlation equation by differentiating the same, thereafter moving all terms to the left-hand side such that the right-hand side becomes 0, and expressing the angular acceleration terms disposed on the left-hand side as a product of a coefficient matrix of angular acceleration and an angular acceleration column vector.

The upper five rows of the coefficient matrix of angular acceleration A in FIG. 4 are obtained by expressing Equations 1 to 5 in the above manner.

Here, although all values of the right-hand side are 0 because the product of the coefficient matrix of angular acceleration and the angular acceleration column vector is expressed on the left-hand side of the equal sign, they are expressed as a product of the coefficient matrix of external torque and the external torque column vector in which all factors have a value of 0, thereby preparing the coefficient matrix of angular acceleration and the coefficient matrix of external torque for Equations 1 to 5 to be merged with the coefficient matrix of angular acceleration and the coefficient matrix of external torque for Equations 6 to 21, respectively, at the bottoms thereof.

Meanwhile, Equations 6 to 21 include, in addition to the external torque terms representing the external torques, internal torque terms representing the remaining torques thereof, and the internal torque terms and angular acceleration terms in logarithmic relationship produce are eliminated and arranged to produce six theorem correlation equations including angular acceleration terms of the powertrain components and external torque terms.

In the six theorem correlation equations calculated above, only the angular acceleration terms are placed on the left-hand side of the equal sign and only external torque terms are placed on the right-hand side thereof, and the left-hand side is expressed as the product of the coefficient matrix of angular acceleration and the angular acceleration column vector, and the right-hand side is expressed as the product of the coefficient matrix of external torque and the external torque column vector, and then these are merged with the coefficient matrix of angular acceleration and coefficient matrix of external torque for Equations 1 to 5, respectively, at the bottoms thereof, thereby obtaining a determinant modeling the powertrain of the vehicle to be controlled as shown in FIG. 4.

For reference, in this embodiment, the internal torques include a torque $T_{S1}$ of the first sun gear S1 of the first planetary gear device PG1, a torque $T_{R1}$ of the first ring gear R1 of the first planetary gear device PG1, a torque $T_{S2}$ of the second sun gear S2 of the second planetary gear device PG2, a torque $T_{R2}$ of the second ring gear R2 of the second planetary gear device PG2, a torque $T_{S3}$ of the third sun gear S3 of the third planetary gear device PG3, a torque $T_{R3}$ of the third ring gear R3 of the third planetary gear device PG3, a transfer gear torque $T_{TF}$, a torque $T_{OUT}$ of the output shaft OUT, a mounting torque $T_{MT}$ of the transmission TM, and the like.

As described above, FIG. 4 shows the state in which the angular acceleration terms in Equations 1 to 21 are separated in the form of the product of the coefficient matrix of angular acceleration A and the angular acceleration column vector B and placed on one side of the equal sign, and in which the external torque terms of the correlation equations are separated in the form of the product of the coefficient matrix of external torque C and the external torque column vector D and placed on the other side thereof.

Figure 5:
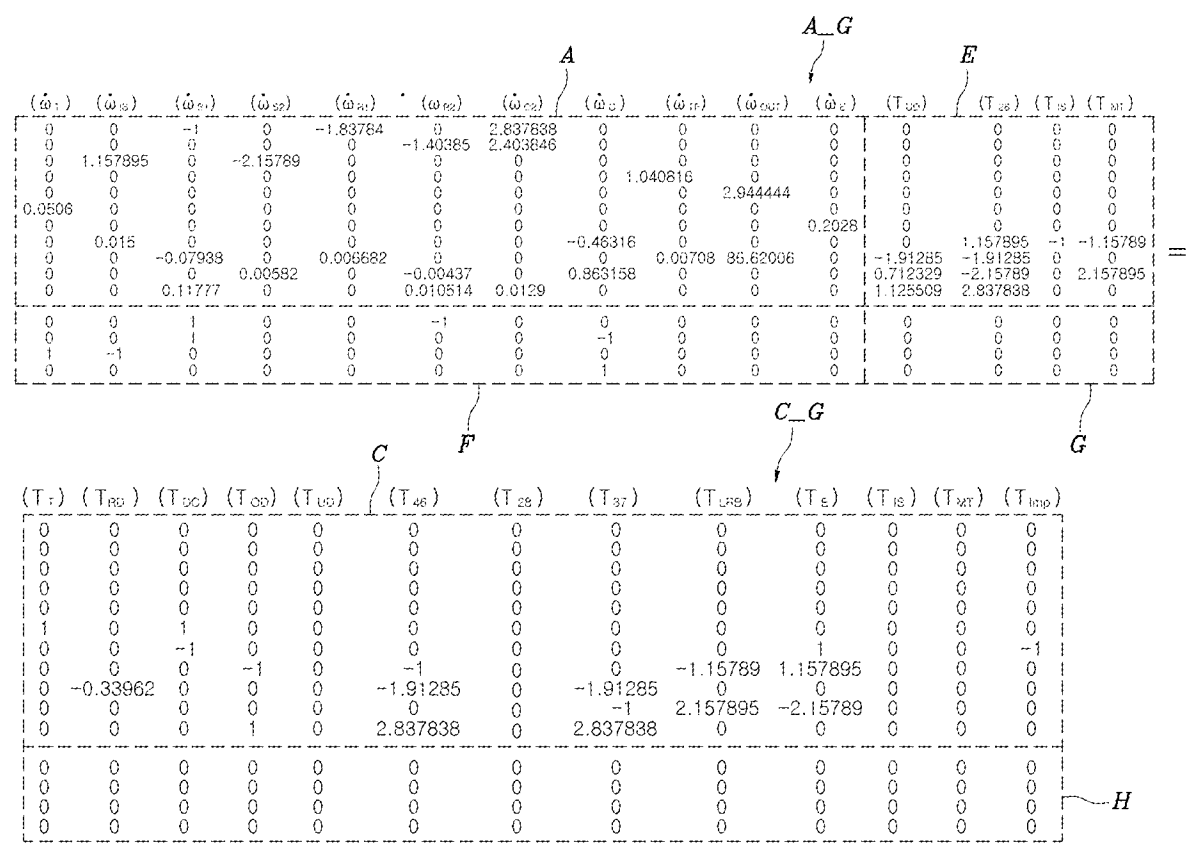

Here, the dominant matrix of angular acceleration A_G is configured as a square matrix, as illustrated in FIG. 5, configured by placing a rigid connection matrix E, which is obtained by multiplying the columns of coefficients for external torque terms of the powertrain components, in the coefficient matrix of external torque, in the fully connected state capable of being regarded as linear variables that change depending on the torque input to the powertrain by −1, so as to be connected to the right side of the coefficient matrix of angular acceleration A, placing a boundary condition matrix F including rows representing boundary conditions according to the state of the transmission TM so as to be connected to the bottom of the coefficient matrix of angular acceleration A, and placing a dummy matrix G filled with 0s at a position where the rigid connection matrix E and the boundary condition matrix F intersect in the coefficient matrix of angular acceleration A.

FIG. 5 shows that the rigid connection matrix E, the boundary condition matrix F, and the dummy matrix G are connected to the coefficient matrix of angular acceleration while omitting the angular acceleration column vector B and external torque column vector D on both sides in order to avoid complexity in the determinant of FIG. 4.

For reference, although the angular acceleration column vector B is expressed herein as it is for convenience of understanding, it should be substantially understood as the state column vector J or B' to be described later.

Meanwhile, the dominant matrix of external torque C_G is shown on the right-hand side in FIG. 5, and the dominant matrix of external torque C_G is configured to include the coefficient matrix of external torque C in FIG. 4 filled with 0s in the columns used in the rigid connection matrix E, and a dummy matrix H filled with 0s in the rows corresponding to the boundary condition matrix F of the dominant matrix of angular acceleration A.

In FIG. 5, the external torques related to the coefficients of the rigid connection matrix E are the torque of the under drive clutch UDC, the torque of the 28-brake 28B, the torque of the input shaft IS, and the mounting torque of the transmission TM, and correspond to external torques capable of being regarded as linear variables in a fully connected state, which change depending on the torque input to the powertrain.

The dominant matrix of angular acceleration in FIG. 5 shows an example of the transmission TM in the second forward gear state, and as shown in FIG. 2, since the underdrive clutch UDC and the 28-brake 28B are engaged in the second forward gear, they may be regarded as being in the fully connected state so that the input shaft IS may be regarded as being in the fully connected state by ignoring its own elastic deformation component and so that the transmission TM may also be regarded as being mounted in the fully connected state without elastic deformation, thereby configuring the rigid connection matrix E by moving the coefficients of these external torques to the left-hand side.

In addition, since the transmission TM is in the second forward gear state, the underdrive clutch UDC is engaged and the 28-brake 28B is engaged as described above, so that the first sun gear S1 and the second ring gear R2 connected to each other by the underdrive clutch UDC have the same angular acceleration and so that the angular acceleration of the first sun gear S1 is equal to the angular acceleration of the transmission case TMC because the 28-brake 28B is engaged, and in the state in which the input shaft IS is directly connected to the turbine T and if the elastic deformation of the input shaft IS itself is ignored as described above, the angular acceleration of the turbine T is the same as the angular acceleration of the input shaft IS, thereby producing the boundary condition matrix F based on the fact that the angular acceleration of the transmission case TMC is 0.

That is, since the first sun gear S1 and the second ring gear R2 have the same angular acceleration, $\dot{\omega}_{S1}=\dot{\omega}_{R2}$, since the angular acceleration of the first sun gear S1 is the same as the angular acceleration of the transmission case TMC, $\dot{\omega}_{S1}=\dot{\omega}_C$, Since the angular acceleration of the turbine T is the same as the angular acceleration of the input shaft IS, $\dot{\omega}_T=\dot{\omega}_{IS}$, and since the angular acceleration of the transmission case TMC is 0, $\dot{\omega}_C=0$. Coefficients obtained by moving all terms of the above four equations to the right-hand sides constitute the boundary condition matrix F.

Therefore, the dominant matrix of angular acceleration A_G may be configured by changing the correlation equations of angular velocities and gear ratios for the rotating components constituting the planetary gear devices of the transmission TM into angular acceleration correlation equations by differentiating the same, moving all terms to one side so that the other side becomes 0, separating the angular acceleration terms placed on one side into the form of the product of the coefficient matrix of angular acceleration and the angular acceleration column vector, and including the separated coefficient matrix of angular acceleration.

In addition, the dominant matrix of angular acceleration A_G may be configured by changing correlation equations of angular velocities and gear ratios for the powertrain components constituting the power transmission path from the output component of the transmission TM to the output shaft OUT to which the wheels WH are coupled into angular acceleration correlation equations by differentiating the same, moving all terms to one side so that the other side becomes 0, separating the angular acceleration terms placed on one side into the form of the product of the coefficient matrix of angular acceleration and the angular acceleration column vector, and including the separated coefficient matrix of angular acceleration.

In addition, the dominant matrix of angular acceleration A_G may be configured by producing theorem correlation equations including the angular acceleration terms of the powertrain components and the external torque terms from the correlation equations of torques and gear ratios for the rotating components constituting the planetary gear devices of the transmission TM, the correlation equations of torques and gear ratios for the rotating components constituting the torque converter TC, and the correlation equations of angular accelerations, moments of inertia, and torques of the powertrain components, placing the angular acceleration terms and external torque terms of the theorem correlation equations to be separated on both sides, separating the angular acceleration terms placed on one side into the form of the product of the coefficient matrix of angular acceleration and the angular acceleration column vector, and including the separated coefficient matrix of angular acceleration.

The control matrices H may be obtained by obtaining the inverse matrix of the dominant matrix of angular acceleration A_G obtained as described above and multiplying the same by the dominant matrix of external torque.

The control matrices H are configured to include in-gear state control matrices H for an in-gear state in which the transmission TM is not shifting and dynamic-state control matrices H for the state in which the transmission TM is shifting.

That is, the in-gear state control matrix H is provided to each shift stage that may be implemented by the transmission TM, and the dynamic-state control matrix H is provided to each transmission component that remains in the engaged state during the gear shifting.

The controller CLR selects a control matrix H for a transmission component that remains in the engaged state before and after gear shifting from among the dynamic-state control matrices H if the transmission TM is shifting, and selects an in-gear state control matrix H provided for each shift stage if the transmission TM is not shifting.

Therefore, in order to control the transmission TM of the powertrain in FIG. 1 as shown in FIG. 2, in-gear control matrices H for the 1st to 8th gear states, a dynamic-state control matrix H in which the underdrive clutch UDC is in the engaged state, a dynamic-state control matrix H in which the overdrive clutch ODC is in the engaged state, a dynamic-state control matrix H in which the 37R-clutch 37RC is in the engaged state, and a dynamic-state control matrix H in which the 28-brake 28B is in the engaged state are required, and at least a total of 12 control matrices H is required.

Here, the dynamic-state control matrix H in which the 37R-clutch 37RC is in the engaged state and the dynamic-state control matrix H in which the 28-brake 28B is in the engaged state may be understood as dynamic-state control matrices H for transmission components that remain in the engaged state during skip shifting in which the gear shifting is performed by skipping intermediate gears.

Figure 6:
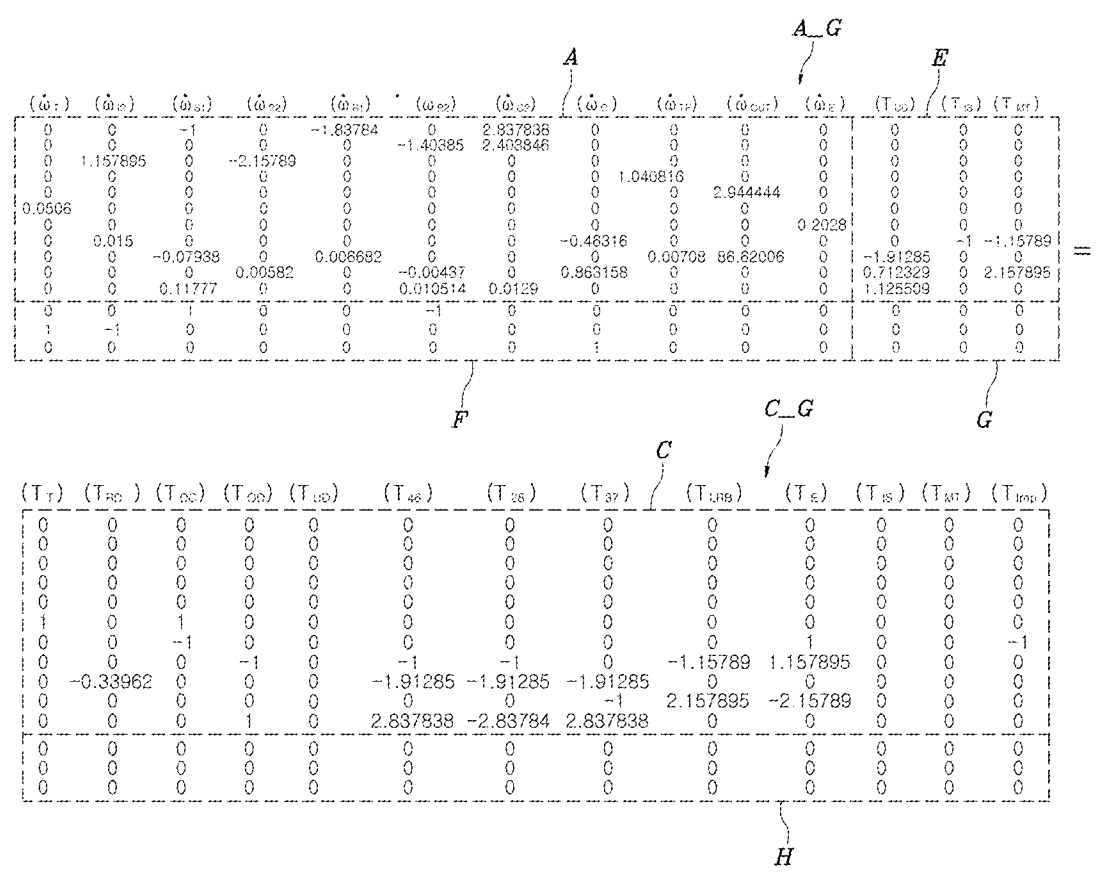

For reference, FIG. 6 shows the relationship between the dominant matrix of angular acceleration A_G and the dominant matrix of external torque C_G for obtaining the dynamic-state control matrix H in which the underdrive clutch UDC is in the engaged state while omitting the angular acceleration column vector and external torque column vector as shown in FIG. 5.

Therefore, if the inverse matrix of the dominant matrix of angular acceleration A_G on the left-hand side in FIG. 6 is obtained and multiplied by the dominant matrix of external torque C_G on the right-hand side, the dynamic-state control matrix H in which the underdrive clutch UDC is in the engaged state is obtained.

A required torque of the transmission component to be controlled is calculated from the correlation equation of control matrix H indicating that the product of the control matrix H and the external torque column vector D multiplied on the right side thereof is equal to a state column vector J configured by arranging the angular accelerations and external torques corresponding to the respective columns of the dominant matrix of angular acceleration A_G in sequence.

Here, the state column vector J is configured by sequentially connecting and arranging the external torques related to the coefficients of the rigid connection matrix E at the bottom of the angular acceleration column vector B.

Actually, the column vector multiplied with respect to the right side of the dominant matrix of angular acceleration on the left-hand side in FIG. 5 is the state column vector J, instead of the angular acceleration column vector.

That is, since the dominant matrix of angular acceleration A_G in FIG. 5 is obtained by connecting the rigid connection matrix E to the right side of the coefficient matrix of angular acceleration A in FIG. 4, the column vector expressed in the form of the product with the dominant matrix of angular acceleration A_G must include the external torques multiplied with the coefficients of the rigid connection matrix E below the angular acceleration column vector B, and thus the state column vector J is made in this way.

Figure 7:
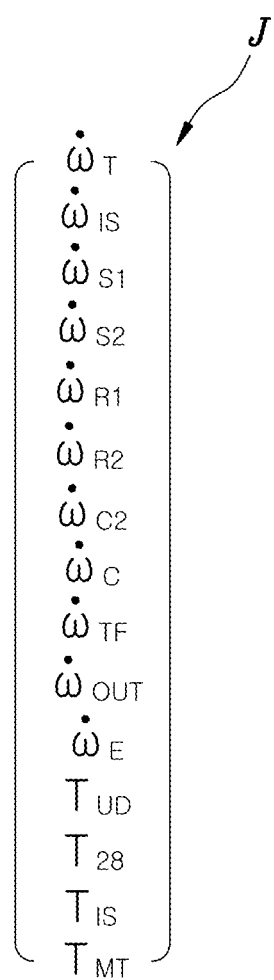
FIG. 7 is a diagram illustrating the state column vector omitted from FIG. 5.
Figure 8:
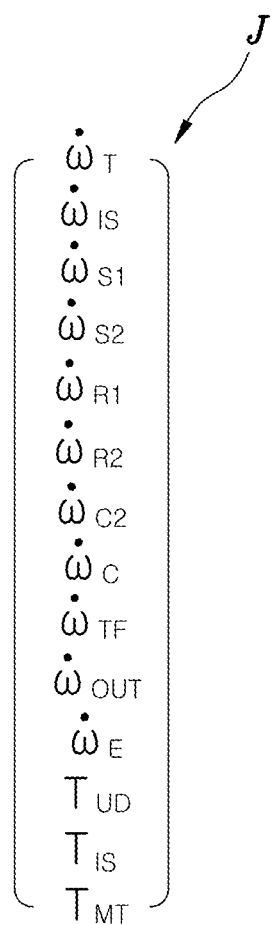
FIG. 8 is a diagram illustrating the state column vector omitted from FIG. 6.

FIG. 7 illustrates the state column vector J omitted from FIG. 5, and FIG. 8 illustrates the state column vector J omitted from FIG. 6.

The correlation equation of control matrix H for calculating the required torque of a transmission component on the release side, among the transmission components to be controlled, uses the in-gear state control matrix H of the current shift stage as the control matrix H.

For example, if the transmission TM in FIG. 1 shifts from the second gear to the third gear, as shown in FIG. 2, the 28-brake 28B is released while the underdrive clutch remains in the engaged state, and the 37R-clutch 37RC is engaged, thereby performing gear shifting.

Therefore, in this case, the correlation equation of control matrix H for calculating the required torque of the 28-brake 28B, which is the transmission component on the release side, uses the in-gear state control matrix H in the second gear, which is the current shift stage, for the control matrix H.

For reference, FIG. 9 shows the correlation equation of control matrix H using the control matrix H in the second gear state, and the required torque of the 28-brake 28B, which is the transmission component on the release side, is calculated using this.

The required torque of the transmission component on the release side is calculated by deleting, as 0, the external torque terms, which are negligible or irrelevant to the current state of the transmission TM, from a partial correlation equation, in the correlation equation of control matrix H, indicating that the product of the row of the control matrix H equal to the row of the external torque corresponding to the torque of the transmission component on the release side, among the rows of the state column vector J, and the external torque column vector is equal to the required torque of the transmission component on the release side.

Here, since the terms of the remaining external torques, excluding the torque of the turbine T and the driving resistance torque, are external torque terms that are negligible or irrelevant to the current state of the transmission TM, the required torque of the transmission component on the release side may be calculated from the correlation equation from which all of them are deleted as 0.

That is, in FIG. 9, the row of the control matrix H equal to the row of the torque of the 28-brake 28B, among the rows of the state column vector J, is multiplied by the external torque column vector, and then the terms of the remaining external torques, excluding the torque of the turbine T and the driving resistance torque, are deleted as 0, and arranged, thereby obtaining an equation such as $T_{28} = -1.017T_T - 0.002T_{RD}$. Accordingly, the controller CLR may calculate the required torque of the 28-brake 28B, which is the transmission component on the release side, by inputting the torque of the turbine T and the driving resistance torque to the above equation, and thus control the 28-brake 28B by calculating hydraulic control pressure to satisfy the calculated required torque.

Here, the torque of the turbine T and the driving resistance torque are information that may be input from a vehicle sensor, another controller, or the like.

In order to calculate the preparatory hydraulic pressure of a transmission component on the coupled side, which is necessary to prevent the shifting sag phenomenon immediately before the transmission TM starts shifting, the controller CLR uses the correlation equation of control matrix H for calculating the required torque of the transmission component on the release side.

That is, the controller CLR calculates the angular acceleration of the output shaft OUT by deleting, as 0, the terms of the remaining external torques, excluding the torque of the turbine T and the driving resistance torque, among the external torque terms, from a partial correlation equation, in the correlation equation of control matrix H, indicating that the product of the row of the control matrix H, which is equal to the row of the angular acceleration of the output shaft OUT to which the wheels WH are connected in the state column vector J, and the external torque column vector is equal to the angular acceleration of the output shaft OUT.

This may be expressed as an equation as follows:

$$\dot{\omega}_{OUT} = 0.034T_T - 0.004T_{RD}$$

Here, the shifting sag phenomenon indicates that the acceleration of the vehicle temporarily and excessively drops immediately before the start of shifting, which tends to occur because the hydraulic control pressure of the transmission component on the coupled side is somewhat excessively applied such that angular acceleration of the output shaft OUT of the vehicle is temporarily and excessively reduced.

Therefore, if the required torque of the transmission component on the coupled side is calculated such that the angular acceleration of the output shaft OUT drops by only about 5%, and if, based on this, the hydraulic control pressure is calculated to control the transmission component on the coupled side, it is possible to prevent excessive deterioration of the angular acceleration of the output shaft OUT, thereby reducing or preventing the shifting sag phenomenon.

To this end, in the case of this embodiment, in order to calculate the preparatory hydraulic pressure of the 37R-clutch 37RC, which is a transmission component on the coupled side, necessary to prevent the shifting sag phenomenon, a correction angular acceleration of the output shaft OUT is calculated by reducing the calculated angular acceleration of the output shaft OUT by a predetermined amount of acceleration reduction.

Here, the correction angular acceleration of the output shaft OUT may be determined as $0.95\dot{\omega}_{OUT}$ with the intention of reducing the angular acceleration of the output shaft OUT by only 5%.

Thereafter, the terms of the remaining external torques, excluding the torque of the turbine T, the driving resistance torque, and the torque of the transmission component on the coupled side, among the external torque terms, are deleted as 0 from a partial correlation equation, in the correlation equation of control matrix H, indicating that the product of the row of the control matrix H, which is equal to the row of the angular acceleration of the output shaft OUT to which the wheels WH are connected in the state column vector J, and the external torque column vector is equal to the angular acceleration of the output shaft OUT, and the correction angular acceleration of the output shaft OUT is replaced with the angular acceleration of the output shaft OUT, thereby calculating the torque of the transmission component on the coupled side.

In other words, the above description may be summarized as an equation as follows:

$$T_{37R} = 1/0.018 \times (-0.034T_T + 0.004T_{RD} + 0.956\dot{\omega}_{OUT})$$

Therefore, the controller CLR may calculate the required torque of the 37R-clutch 37RC through the above equation to prevent the shifting sag phenomenon, then calculate the hydraulic control pressure for realizing the above-calculated torque of the transmission component on the coupled side, determine the preparatory hydraulic pressure of the transmission component on the coupled side necessary to prevent the shifting sag phenomenon, and control the transmission component on the coupled side using the preparatory hydraulic pressure immediately before shifting, thereby preventing or reducing the shifting sag phenomenon so as to improve the shifting quality of the vehicle and ultimately increase the marketability of the vehicle.

Meanwhile, the controller CLR may calculate the hydraulic control pressure of the transmission component to maintain the in-gear state of the transmission TM through the correlation equation of control matrix H using the in-gear state control matrix H described above and apply the same to the line pressure management of the hydraulic system of the transmission TM.

For example, since the line pressure is required to maintain the underdrive clutch torque in the second gear state, the controller CLR may calculate the underdrive clutch torque using a correlation equation corresponding to the row of the underdrive clutch torque in the state column vector J of FIG. 9 and then calculate the hydraulic control pressure to be provided to the underdrive clutch through this, thereby, based on this, calculating the line pressure to be maintained by the hydraulic system of the transmission TM.

That is, the controller CLR may calculate the required torque of the underdrive clutch using the following correlation equation:

$$T_{UD}=2.563T_T+0.006T_{RD}$$

The correlation equation of control matrix H for calculating the required torque of the transmission component on the coupled side, among the transmission components to be controlled, uses a dynamic-state control matrix H for a transmission component that remains in the engaged state before and after the corresponding shifting as the control matrix H.

That is, in the case of shifting from the second gear to the third gear, since the transmission component that remains in the engaged state before and after the gear shifting is the underdrive clutch, the correlation equation of control matrix H in this case uses the dynamic-state control matrix H for the underdrive clutch as the control matrix H.

FIG. 10 shows a correlation equation of control matrix H using a dynamic-state control matrix H for an underdrive clutch as the control matrix H.

Among the required torques of the transmission component on the coupled side, the target torque of the transmission component on the coupled side for entering the inertia phase in which the angular velocity of the turbine T starts to decrease is determined by calculating the torque of the transmission component on the coupled side from a correlation equation obtained by zeroizing the angular acceleration of the turbine T in a partial correlation equation, in the correlation equation of control matrix H, indicating that the product of the row of the control matrix H, which is equal to the row of the angular acceleration of the turbine T in the state column vector J, and the external torque column vector is equal to the angular acceleration of the turbine T, and deleting, as 0, the terms of the remaining external torques, excluding the torque of the turbine T, the driving resistance torque, and the torque of the transmission component on the coupled side, among the external torque terms, therefrom.

That is, the target torque of the 37R-clutch 37RC, which is the transmission component on the coupled side, may be calculated through the following equation:

$$T_{37R}=1/13.23\times(80.901T_T-0.014T_{RD})$$

For reference, in this equation, the angular acceleration $\dot{\omega}_T$ of the turbine T is set to 0.

Here, setting the angular acceleration of the turbine T to 0 is due to the fact that in the case of power-on upshifting, the angular velocity of the turbine T rises as time passes during the torque phase and then starts to decrease in the inertia phase so that the torque of the transmission component on the coupled side when the angular velocity of the turbine T has the maximum value in the gear shifting may be regarded as the target torque of the transmission component on the coupled side.

The controller CLR deletes, as 0, the terms of the remaining external torques, excluding the torque of the turbine T, the driving resistance torque, and the torque of the transmission component on the coupled side, among the external torque terms, from the partial correlation equation of the correlation equation of control matrix H used in obtaining the required torque of the transmission component on the coupled side, then replaces a target change rate of the turbine T per unit time by the angular acceleration of the turbine T, controls the transmission component on the coupled side using the target torque, and then calculates a PID torque, which is the torque of the transmission component on the coupled side, to be changed.

That is, in the example of shifting from the second gear to the third gear, since the transmission component on the coupled side is the 37R-clutch 37RC, this may be expressed as an equation as follows:

$$T_{37R\_PID}=1/13.23\times(8.901T_T-0.014T_{RD}-\Delta\dot{\omega}_T)$$

Here, $T_{37R\_PID}$ is the PID torque of the transmission component on the coupled side, and $\Delta\dot{\omega}_T$ is the target change rate of the turbine T per unit time, which is calculated by dividing the angular velocity of the turbine T to be changed during the target shifting time by the target shifting time, and the target shifting time and the angular velocity of the turbine T to be changed during the target shifting time may be calculated by the controller CLR using a known technology in consideration of the shifting situation.

The controller CLR corrects the PID torque using the difference between the target value and the measured value of the angular acceleration of the turbine T as a feedback component during the inertia phase, calculates hydraulic pressure for realizing the corrected PID torque of the transmission component on the coupled side, and repeatedly determines the PID hydraulic control pressure to be changed during the target shifting time for the transmission component on the coupled side.

Meanwhile, the controller CLR deletes, as 0, the terms of the remaining external torques, excluding the torque of the turbine T, the driving resistance torque, and the torque of the transmission component on the coupled side, among the external torque terms, from the partial correlation equation of the correlation equation of control matrix H used in obtaining the required torque of the transmission component on the coupled side, then replaces a target change rate of the turbine T per unit time by the angular acceleration of the turbine T, calculates a torque of the turbine T, and performs requesting reduction in the torque of the engine E using a value obtained by dividing the torque of the turbine T by the torque amplification ratio of the torque converter TC.

That is, the controller CLR may calculate the torque of the turbine T as described above for a request for engine torque reduction (ETR) required during the gear shifting and, based on this, perform requesting the engine torque reduction.

For example, a correlation equation for calculating the torque of the turbine T may be expressed as follows:

$$T_T=(\Delta\dot{\omega}_T+0.014T_{RD}+13.23T_{37R})$$

Meanwhile, when controlling the transmission component to be controlled to perform gear shifting, the controller CLR performs a step S60 of learning the difference between the control target and the actual shift state and a step S70 of correcting a hydraulic control pressure according to the information learned in the learning step between a step S40 of calculating the hydraulic control pressure for realizing the required torque of a transmission component to be controlled and a step S50 of controlling the transmission component to be controlled using the calculated hydraulic control pressure.

That is, in the case of gear shifting by controlling the transmission TM using the hydraulic control pressure determined through the correlation equation of control matrix H described above, the difference between the control target and the actual shift state, which is caused by individual machining errors and assembly errors of the transmission TM may be learned, and, based on this, the hydraulic control pressure may be corrected, thereby realizing stable implementation of the gear shifting control based on the model according to the present disclosure.

For reference, in addition to correcting the hydraulic control pressure as described above as illustrated in FIG. 3, it may be possible to further apply special correction such as correction according to the accelerator pedal operation state with reference to the output of the acceleration position sensor (APS).

According to the present disclosure, if only the control matrices H pre-calculated suitable for the transmission TM mounted to the vehicle are input to the controller CLR, the angular accelerations or external torques of the required powertrain components may be immediately calculated depending on the driving situation of the vehicle to be used for control and may be automatically corrected by learning, so it is possible to perform rapid mapping of control data and secure reliability of control data without requiring excessive performance of the controller CLR, thereby ultimately increasing marketability by improving the gear shifting quality of the vehicle.

Although the present disclosure has been described and illustrated in conjunction with particular embodiments thereof, it will be apparent to those skilled in the art that various improvements and modifications may be made to the present disclosure without departing from the technical idea of the present disclosure defined by the appended claims.

The invention claimed is:

1. A method of controlling a powertrain of a vehicle, the method comprising:
   determining, by a controller, whether a transmission is shifting, and when the transmission is shifting, determining a type of shifting;
   selecting a predetermined control matrix according to whether the transmission is shifting and the type of shifting;
   calculating a required torque of a transmission component to be controlled based on the predetermined control matrix;
   calculating a hydraulic control pressure to implement the required torque of the transmission component to be controlled; and
   controlling the transmission component to be controlled using the calculated hydraulic control pressure;
   wherein the predetermined control matrix is calculated using correlation equations of angular velocities, angular accelerations, moments of inertia, and torques of powertrain components, and boundary conditions according to a state of the transmission.

2. The method of claim 1, wherein the predetermined control matrix is calculated by multiplying an inverse matrix of a dominant matrix of angular acceleration configured to comprise coefficients of angular acceleration terms of the correlation equations by a dominant matrix of external torque configured to comprise coefficients of external torque terms of the correlation equations, and
   wherein the external torque is a torque capable of being controlled by the controller or input to the powertrain from an outside.

3. The method of claim 2, wherein the dominant matrix of angular acceleration is configured by changing correlation equations of angular velocities and gear ratios for rotating components constituting planetary gear devices of the transmission into angular acceleration correlation equations by differentiating the correlation equations of angular velocities and gear ratios same, moving all terms to one side such that the other side becomes 0, and separating the angular acceleration terms placed on one side into a form of a product of a coefficient matrix of angular acceleration and an angular acceleration column vector, so that the dominant matrix includes the coefficient matrix of angular acceleration.

4. The method of claim 2, wherein the dominant matrix of angular acceleration is configured by changing correlation equations of angular velocities and gear ratios for powertrain components constituting a power transmission path from an output component of the transmission to an output shaft to which wheels are coupled into angular acceleration correlation equations by differentiating the correlation of equations of angular velocities and gear ratios same, moving all terms to one side such that the other side becomes 0, and separating the angular acceleration terms placed on one side into a form of a product of a coefficient matrix of angular acceleration and an angular acceleration column vector, so that the dominant matrix includes the coefficient matrix of angular acceleration.

5. The method of claim 2, wherein the dominant matrix of angular acceleration is configured by producing theorem correlation equations including the angular acceleration terms of the powertrain components and the external torque terms from correlation equations of torques and gear ratios for rotating components constituting planetary gear devices of the transmission, correlation equations of torques and gear ratios for rotating components constituting a torque converter, and correlation equations of angular accelerations, moments of inertia, and torques of the powertrain components, placing the angular acceleration terms and external torque terms of the theorem correlation equations to be separated on both sides, and separating the angular acceleration terms placed on one side into a form of the product of a coefficient matrix of angular acceleration and an angular acceleration column vector, so that the dominant matrix includes the coefficient matrix of angular acceleration.

6. The method of claim 2, wherein the predetermined control matrix comprises:
   a plurality of in-gear state control matrices for an in-gear state in which the transmission is not shifting; and
   a plurality of dynamic-state control matrices for a state in which the transmission is shifting.

7. The method of claim 6, wherein each of the plurality of in-gear state control matrices is provided to each shift stage capable of being implemented by the transmission, and
   wherein each of the plurality of dynamic-state control matrices is provided to each transmission component that remains in an engaged state during gear shifting.

8. The method of claim 7, wherein, when the transmission is shifting, the controller selects a control matrix for a transmission component that remains in the engaged state before and after gear shifting from among the plurality of dynamic-state control matrices.

9. The method of claim 8, wherein the dominant matrix of angular acceleration is configured as a square matrix configured by:
   separating the angular acceleration terms of the correlation equations into a form of the product of a coefficient matrix of angular acceleration and an angular acceleration column vector so as to be placed on one side;
   separating the external torque terms of the correlation equations into a form of the product of a coefficient matrix of external torque and an external torque column vector so as to be placed on the other side;
   placing a rigid connection matrix, which is obtained by multiplying columns of coefficients for external torque terms of the powertrain components, in the coefficient matrix of external torque, in a fully connected state capable of being regarded as linear variables that change depending on the torque input to the powertrain by −1, so as to be connected to a right side of the coefficient matrix of angular acceleration;

placing a boundary condition matrix including rows representing boundary conditions according to the state of the transmission so as to be connected to a bottom of the coefficient matrix of angular acceleration; and placing a dummy matrix filled with 0s at a position where the rigid connection matrix and the boundary condition matrix intersect in the coefficient matrix of angular acceleration.

10. The method of claim 9, wherein the dominant matrix of external torque comprises:

the coefficient matrix of external torque filled with 0s in the columns used in the rigid connection matrix; and a dummy matrix filled with 0s in the rows corresponding to the boundary condition matrix of the dominant matrix of angular acceleration.

11. The method of claim 9, wherein the required torque of the transmission component to be controlled is calculated from a correlation equation of a control matrix indicating that the product of the control matrix and the external torque column vector multiplied on the right side of the control matrix is equal to a state column vector configured by arranging the angular accelerations and external torques corresponding to the respective columns of the dominant matrix of angular acceleration in sequence.

12. The method of claim 11, wherein the correlation equation of the control matrix for calculating the required torque of the transmission component on a release side, among the transmission components to be controlled, uses an in-gear state control matrix of a current shift stage as the control matrix.

13. The method of claim 12, wherein the required torque of the transmission component on the release side is calculated by deleting, as 0, external torque terms, which are negligible or irrelevant to a current state of the transmission, from a partial correlation equation, in the correlation equation of the control matrix, indicating that a product of the row of the control matrix equal to the row of the external torque corresponding to the torque of the transmission component on the release side, among the rows of the state column vector, and the external torque column vector is equal to the required torque of the transmission component on the release side.

14. The method of claim 12, wherein the required torque of the transmission component on the release side is calculated by deleting, as 0, the terms of the remaining external torques, excluding a turbine torque and a driving resistance torque, among the terms of the external torques, from a partial correlation equation, in the correlation equation of the control matrix, indicating that the product of the row of the control matrix equal to the row of the external torque corresponding to the torque of the transmission component on the release side, among the rows of the state column vector, and the external torque column vector is equal to the required torque of the transmission component on the release side.

15. The method of claim 12, wherein the controller is further configured to:

use, in order to calculate a preparatory hydraulic pressure of the transmission component on a coupled side, which is necessary to prevent the shifting sag phenomenon immediately before the transmission starts shifting, the correlation equation of the control matrix for calculating the required torque of the transmission component on the release side;

calculate the angular acceleration of an output shaft by deleting, as 0, the terms of the remaining external torques, excluding a turbine torque and a driving resistance torque, among the external torque terms, from a partial correlation equation, in the correlation equation of the control matrix, indicating that the product of the row of the control matrix, which is equal to the row of the angular acceleration of the output shaft to which wheels are connected in the state column vector, and the external torque column vector is equal to the angular acceleration of the output shaft;

calculate a correction angular acceleration of the output shaft by reducing the calculated angular acceleration of the output shaft by a predetermined amount of acceleration reduction;

delete, as 0, the terms of the remaining external torques, excluding the turbine torque, the driving resistance torque, and a torque of the transmission component on the coupled side, among the external torque terms, from a partial correlation equation, in the correlation equation of the control matrix, indicating that the product of the row of the control matrix, which is equal to the row of the angular acceleration of the output shaft to which the wheels are connected in the state column vector, and the external torque column vector is equal to the angular acceleration of the output shaft;

replace the correction angular acceleration of the output shaft with the angular acceleration of the output shaft;

calculate a torque of the transmission component on the coupled side; and calculate a hydraulic pressure for realizing the calculated torque of the transmission component on the coupled side to determine the preparatory hydraulic pressure of the transmission component on the coupled side necessary to prevent the shifting sag phenomenon.

16. The method of claim 11, wherein the correlation equation of the control matrix for calculating the required torque of the transmission component on a coupled side, among the transmission components to be controlled, uses a dynamic-state control matrix for a transmission component that remains in the engaged state before and after the corresponding shifting as the control matrix.

17. The method of claim 16, wherein, among the required torques of the transmission component on the coupled side, a target torque of the transmission component on the coupled side for entering an inertia phase in which the angular velocity of the turbine starts to decrease is determined by calculating a torque of the transmission component on the coupled side from a correlation equation obtained by zeroizing the angular acceleration of the turbine in a partial correlation equation, in the correlation equation of the control matrix, indicating that the product of the row of the control matrix, which is equal to the row of the angular acceleration of the turbine in the state column vector, and the external torque column vector is equal to the angular acceleration of the turbine, and deleting, as 0, the terms of the remaining external torques, excluding the torque of the turbine, a driving resistance torque, and the torque of the transmission component on the coupled side, among the external torque terms, therefrom.

18. The method of claim 17, wherein the controller is further configured to:

delete, as 0, the terms of the remaining external torques, excluding the torque of the turbine, the driving resistance torque, and the torque of the transmission component on the coupled side, among the external torque terms, from the partial correlation equation of the correlation equation of the control matrix used in obtaining the required torque of the transmission component on the coupled side;

replace a target change rate of the turbine per unit time by the angular acceleration of the turbine;

control the transmission component on the coupled side using the target torque;

calculate a PID torque, which is the torque of the transmission component on the coupled side, to be changed;

correct the PID torque using a difference between a target value and a measured value of the angular acceleration of the turbine as a feedback component during the inertia phase;

calculate a hydraulic pressure for realizing the corrected PID torque of the transmission component on the coupled side; and repeatedly determine a PID hydraulic control pressure to be changed during a target shifting time for the transmission component on the coupled side, and wherein the target change rate of the turbine per unit time is calculated by dividing the angular velocity of the turbine to be changed during the target shifting time by the target shifting time.

19. The method of claim 18, wherein the controller is further configured to:

delete, as 0, the terms of the remaining external torques, excluding the torque of the turbine, the driving resistance torque, and the torque of the transmission component on the coupled side, among the external torque terms, from the partial correlation equation of the correlation equation of the control matrix used in obtaining the required torque of the transmission component on the coupled side;

replace the target change rate of the turbine per unit time by the angular acceleration of the turbine;

calculate the torque of the turbine; and perform requesting engine torque reduction using a value obtained by dividing the torque of the turbine by a torque amplification ratio of the torque converter.

20. The method of claim 1, wherein the controller is configured to perform, when controlling the transmission component to be controlled to perform gear shifting, a step of learning a difference between a control target and an actual shift state, and to further perform a step of correcting a hydraulic control pressure according to information learned in the learning step between a step of calculating the hydraulic control pressure for realizing the required torque of the transmission component to be controlled and a step of controlling the transmission component to be controlled using the calculated hydraulic control pressure.

\* \* \* \* \*